United States Patent [19]

Koyama et al.

[11] Patent Number: 5,726,868
[45] Date of Patent: Mar. 10, 1998

[54] ROBBERY-PROOF MECHANISM FOR VEHICLE MOUNTED ELECTRONIC APPARATUS

[75] Inventors: Kazuya Koyama, Houya; Masayoshi Aoki, Hachiouji; Jun Muramatsu, Kamiina gun; Tohru Masumoto, Hachiouji; Masami Matsumoto, Hino; Kiyoshi Hosoi, Tokyo, all of Japan

[73] Assignee: Kabushiki Kaisha Kenwood, Tokyo, Japan

[21] Appl. No.: 575,752

[22] Filed: Dec. 20, 1995

[30] Foreign Application Priority Data

Dec. 29, 1994 [JP] Japan .................. 6-339875

[51] Int. Cl.$^6$ .................................. H02B 1/01
[52] U.S. Cl. .................. 361/832; 361/724; 361/727; 312/7.1
[58] Field of Search .................. 361/679, 681, 361/724–725, 814, 832, 825, 829; 220/329, 331, 345, 350, 351; 312/7.1, 8.12, 8.15, 295, 310; 49/254

[56] References Cited

U.S. PATENT DOCUMENTS

| 4,884,646 | 12/1989 | Zambias | 312/7.1 X |
| 4,979,774 | 12/1990 | Houser | 312/7.1 X |
| 5,184,489 | 2/1993 | Squires et al. | 312/7.1 X |
| 5,558,394 | 9/1996 | Mori et al. | 296/214 |

FOREIGN PATENT DOCUMENTS

| 3537371 | 4/1987 | Germany. |
| 3538224 | 5/1987 | Germany. |

*Primary Examiner*—Michael W. Phillips
*Assistant Examiner*—Jayprakash N. Gandhi
*Attorney, Agent, or Firm*—Sixbey, Friedman, Leedom & Ferguson, P.C.; Gerald J. Ferguson, Jr.

[57] ABSTRACT

A robbery-proof mechanism for a vehicle mounted electronic apparatus wherein a cover for covering the electronic apparatus is accommodated in the upper space of the electronic apparatus and can be driven by a small scale drive mechanism without moving the electronic apparatus. The robbery-proof mechanism includes: a frame mounted on the front of the vehicle mounted electronic apparatus, being rotative between a horizontal position and a vertical position; a cover capable of being inserted into a groove formed in the frame; a drive mechanism for driving the cover in the horizontal direction between a position in the groove of the frame and a position retracted from the frame; and a drive mechanism for driving an operation panel in the horizontal direction, wherein the frame is rotated to the horizontal position, the cover is then moved into the groove of the frame and the operation panel is moved backward, and the frame together with the cover is rotated to the vertical position to cover the operation panel with the cover.

10 Claims, 8 Drawing Sheets

[Fig.3]
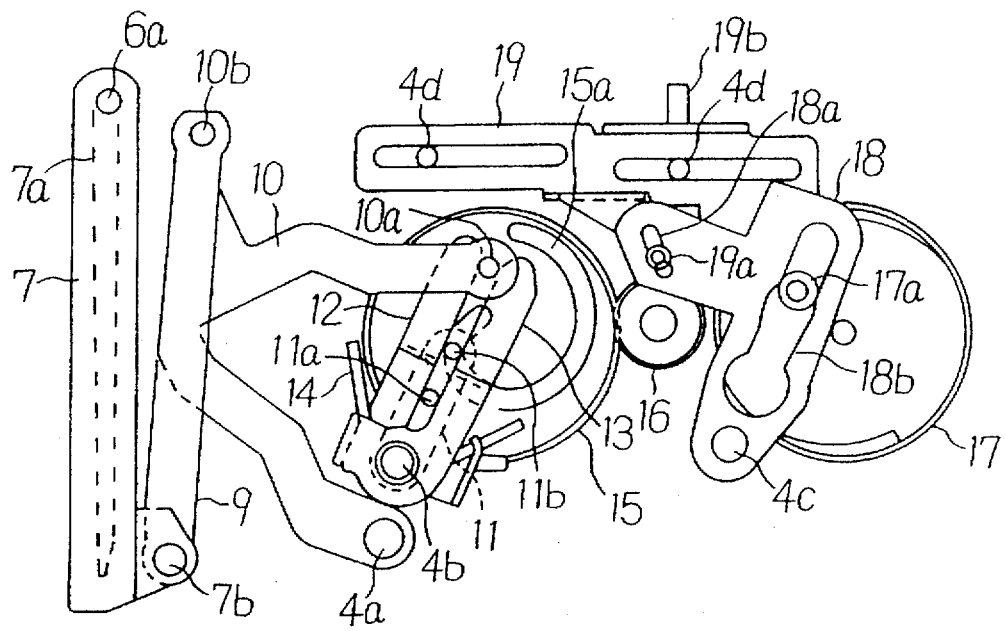
[Fig.4]
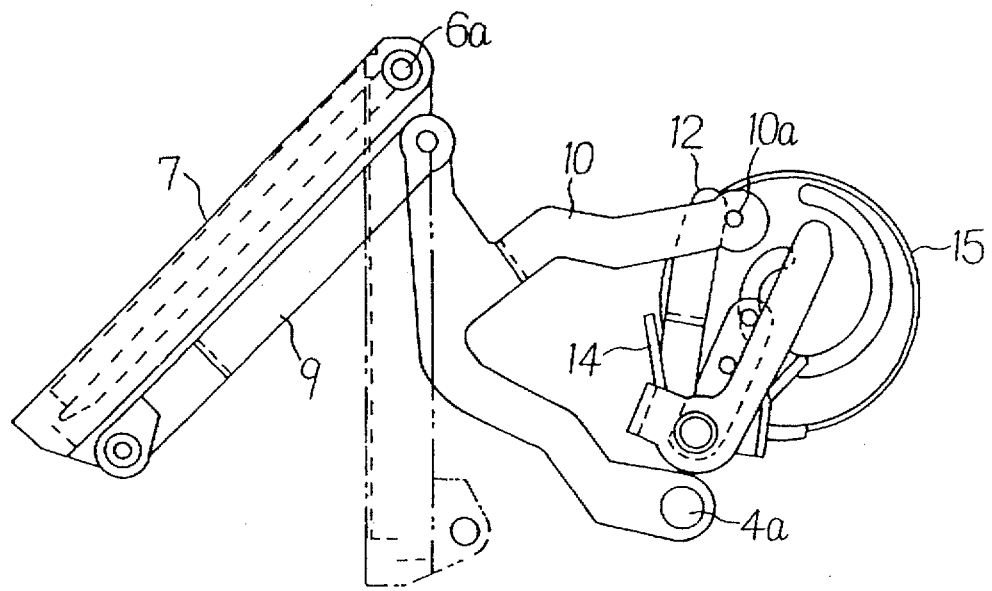

[Fig.7]
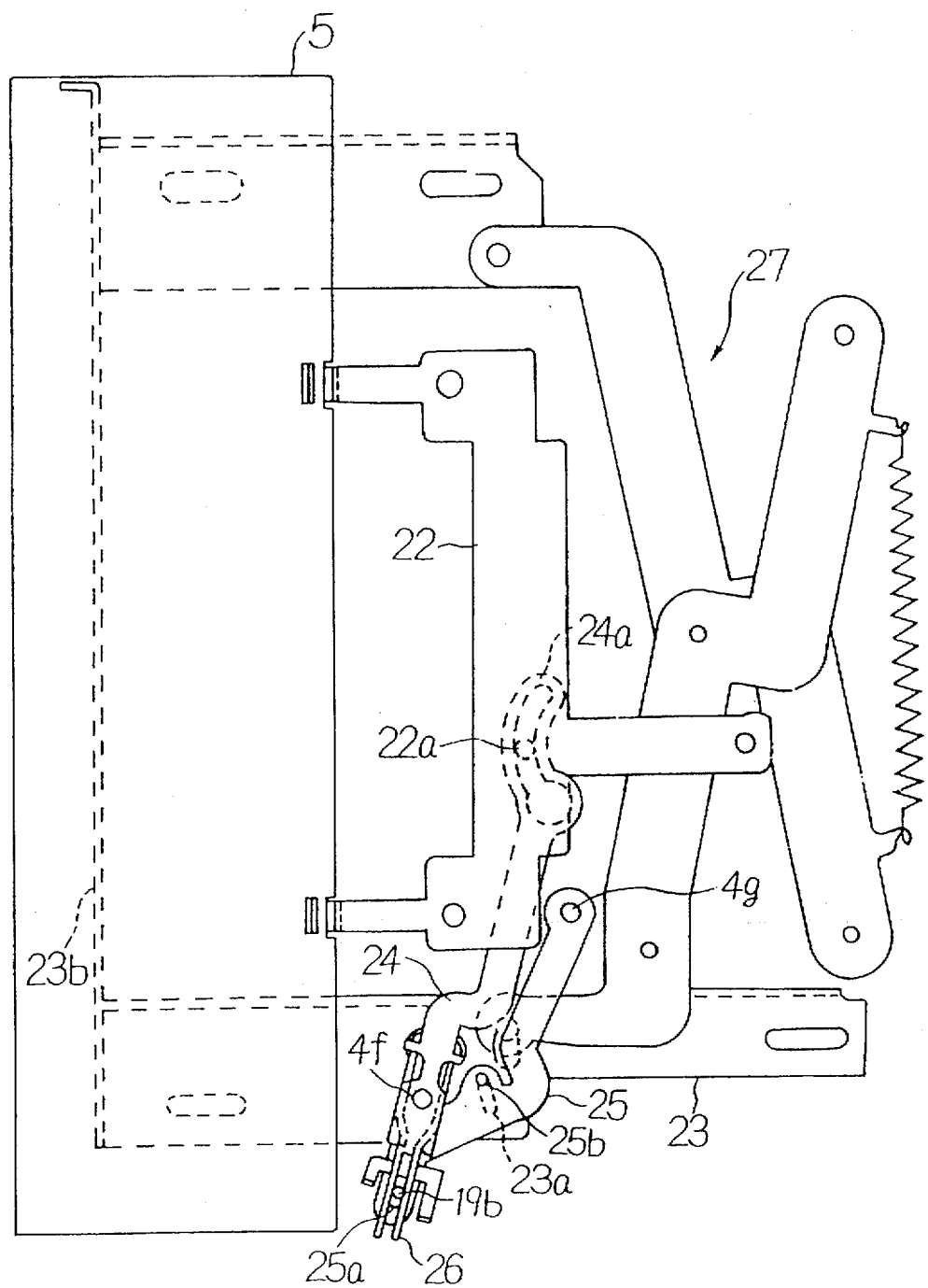

[Fig.8]
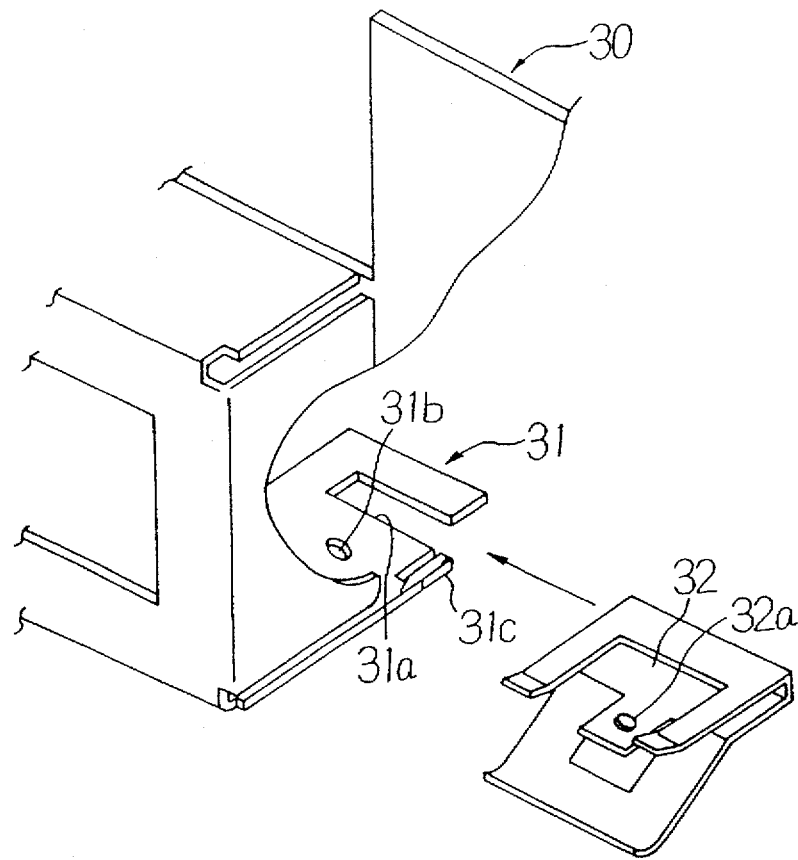
[Fig.9]
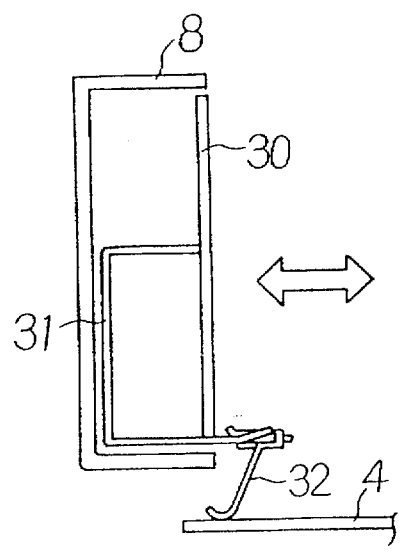

5,726,868

1

ROBBERY-PROOF MECHANISM FOR VEHICLE MOUNTED ELECTRONIC APPARATUS

BACKGROUND OF THE INVENTION

1. Field of the Invention

The present invention relates to a robbery-proof mechanism for a vehicle mounted electronic apparatus, and more particularly to a robbery-proof mechanism for a vehicle mounted electronic apparatus which covers the front of the electronic apparatus so as to shield it from the eyes of a robber while a driver moves away from the vehicle.

2. Related Background Art

A robbery-proof mechanism is known which covers the front of a vehicle mounted electronic apparatus so as to hide it. An example of such a conventional robbery-proof mechanism for a vehicle mounted electronic apparatus is shown in FIGS. 12A to 12C. As seen from FIGS. 12A to 12C, a vehicle mounted acoustic apparatus 2 is housed in a case 1 having a lid 3. As the vehicle mounted acoustic apparatus 2 is moved forward and backward by a motor, the lid 3 is opened and closed. FIG. 12A shows the state of the opened lid 3 (use state of the vehicle mounted acoustic apparatus), FIG. 12C shows the state of the closed lid 3, and FIG. 12B shows the intermediate state between the opened and closed states of the lid 3.

This robbery-proof mechanism for a vehicle mounted acoustic apparatus requires a large power motor for moving the heavy vehicle mounted acoustic apparatus 2, and so the drive mechanism becomes bulky, the drive sound is large, and the current consumption is large. The case 1 becomes large because the drive mechanism is mounted therein. The mount area of the vehicle is required to be worked so as to accommodate the case 1 at the worst. Furthermore, when the vehicle mounted acoustic apparatus is in use, the lid 3 projects outward. The projected lid 3 degrades the outer ornamental appearance and becomes an obstacle against the driver.

Another robbery-proof mechanism for a vehicle mounted acoustic apparatus proposed in Japanese Patent Laid-open Publication Hei 6-247214 has the structure that the lid is housed in the upper space of the acoustic apparatus when it is used. However, this robbery-proof mechanism also moves the vehicle mounted acoustic apparatus when it is used or not used, so that this mechanism is associated with similar problems described above.

SUMMARY OF THE INVENTION

This invention has been made under the above circumstances and aims at providing a robbery-proof mechanism for a vehicle mounted electronic apparatus, capable of accommodating a cover for shielding the front of the electronic apparatus in the apparatus and being driven by a small scale driving mechanism without moving the electronic apparatus.

A robbery-proof mechanism for a vehicle mounted electronic apparatus of this invention comprises: a frame mounted on the front of the vehicle mounted electronic apparatus, being rotative between a horizontal position and a vertical position; a cover capable of being inserted into a groove formed in the frame; and a drive mechanism for driving the cover in the horizontal direction between a position in the groove of the frame and a position retracted from the frame, wherein the frame is rotated to the horizon-

2 tal position, the cover is then moved into the groove of the frame, and the frame together with the cover is rotated to the vertical position to cover an operation panel with the cover.

A robbery-proof mechanism for a vehicle mounted electronic apparatus of this invention is structured such that an operation panel is moved forward when a cover being opened and closed at the front of the vehicle mounted electronic apparatus is opened, and the operation panel is moved backward when the cover is closed.

A robbery-proof mechanism for a vehicle mounted electronic apparatus of this invention comprises: a cover mounted on the front of the vehicle mounted electronic apparatus, being rotative between a horizontal position and a vertical position and being movable in the horizontal direction, wherein when the cover is at the vertical position, an operation panel is retracted to the horizontal direction.

A robbery-proof mechanism for a vehicle mounted electronic apparatus of this invention comprises: a frame mounted on the front of the vehicle mounted electronic apparatus, being rotative between a horizontal position and a vertical position; a cover capable of being inserted into a groove formed in the frame; a drive mechanism for driving the cover in the horizontal direction between a position in the groove of the frame and a position retracted from the frame; and a drive mechanism for driving an operation panel in the horizontal direction, wherein the frame is rotated to the horizontal position, the cover is then moved into the groove of the frame and the operation panel is moved backward, and the frame together with the cover is rotated to the vertical position to cover the operation panel with the cover.

In each of the robbery-proof mechanisms for a vehicle mounted electronic apparatus, driving the cover in the horizontal direction is performed together with driving the operation panel.

In each of the robbery-proof mechanisms for a vehicle mounted electronic apparatus, a conductive member is fitted in an LCD holder mounted on the operation panel, the conductive member being in slide contact with a chassis by the elastic force of the conductive member.

In each of the robbery-proof mechanisms for a vehicle mounted electronic apparatus, the rotation center of the frame or the cover is set to an upper side of the vehicle mounted electronic apparatus.

In each of the robbery-proof mechanisms for a vehicle mounted electronic apparatus, a switch is actuated by pushing the frame, the switch being used for starting the operation of moving the cover from the position where the cover covers the operation panel to the position where the cover is retracted from the frame.

In each of the robbery-proof mechanisms for a vehicle mounted electronic apparatus, when a switch is actuated, the operation of moving the cover from an open state to a close state starts after a predetermined time lapse, the switch being used for starting the operation.

According to the robbery-proof mechanism for a vehicle mounted electronic apparatus, only the light weight elements such as a cover, a frame for loading the cover, and an operation panel are driven.

Accordingly, the drive mechanism can be made small, and it is possible to mount the robbery-proof mechanism for a vehicle mounted electronic apparatus, without working a mount space of the vehicle. Noises are not generated while driving.

With the robbery-proof mechanism for a vehicle mounted electronic apparatus wherein the operation panel is moved forward and backward, the operation panel is positioned flush with the mount surface of the electronic apparatus when it is in use. Therefore, it is easy to use. When the operation panel is not in use, the cover covering the operation panel is positioned flush with the mount surface of the electronic apparatus. Therefore, the electronic apparatus can be made hard to be confirmed.

With the robbery-proof mechanism for a vehicle mounted electronic apparatus wherein the conductive member is fitted in the LCD holder mounted on the operation panel, electrostatic charges generated by friction are grounded to the chassis via the conductive member. Therefore, the breakage of the LCD can be avoided.

With the robbery-proof mechanism for a vehicle mounted electronic apparatus wherein the rotation center of the frame is set to the upper side, the open space under the frame when it is not completely closed is hard to be seen. Therefore, a presence of the vehicle mounted electronic apparatus is difficult to be confirmed.

With the robbery-proof mechanism for a vehicle mounted electronic apparatus wherein the switch for starting opening the robbery-proof mechanism is actuated by the frame, the switch is not needed to be mounted at the place remote from the vehicle mounted electronic apparatus. Therefore, the mount of the vehicle mounted electronic apparatus becomes easy. With the robbery-proof mechanism for a vehicle mounted electronic apparatus wherein the robbery-proof mechanism starts operating after a predetermined time lapse after the switch is actuated, there is less possibility of abutting a hand on the frame when the driver is manipulating the operation panel.

BRIEF DESCRIPTION OF THE DRAWINGS

FIGS. 3 to 10 are partial side views of the robbery-proof mechanism for a vehicle mounted acoustic apparatus.

DETAILED DESCRIPTION OF THE PREFERRED EMBODIMENTS

Figure 1A:
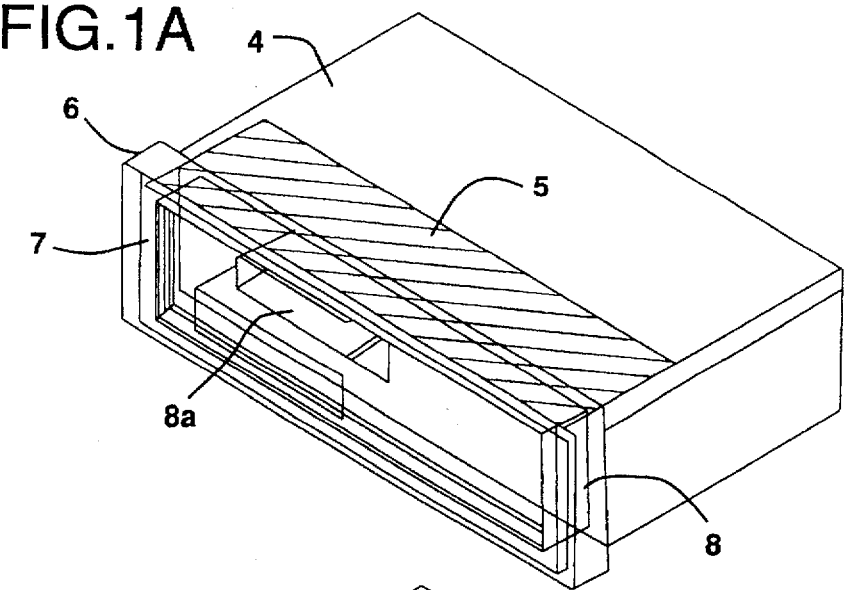
FIGS. 1A to 1C are perspective views illustrating the operation of a robbery-proof mechanism for a vehicle mounted acoustic apparatus according to an embodiment of the invention.

A robbery-proof mechanism for a vehicle mounted acoustic apparatus according to an embodiment of the invention will be described with reference to the accompanying drawings. The outline of the operation of the robbery-proof mechanism will be described with reference to FIGS. 1A to 1C and FIGS. 2A to 2C. In these figures, reference numeral 4 represents a chassis for housing a vehicle mounted acoustic apparatus, the chassis being mounted on a mount area of the vehicle. An escutcheon 7 is fixed to the chassis 4 and rotatively supports a frame 7.

Figure 1B:
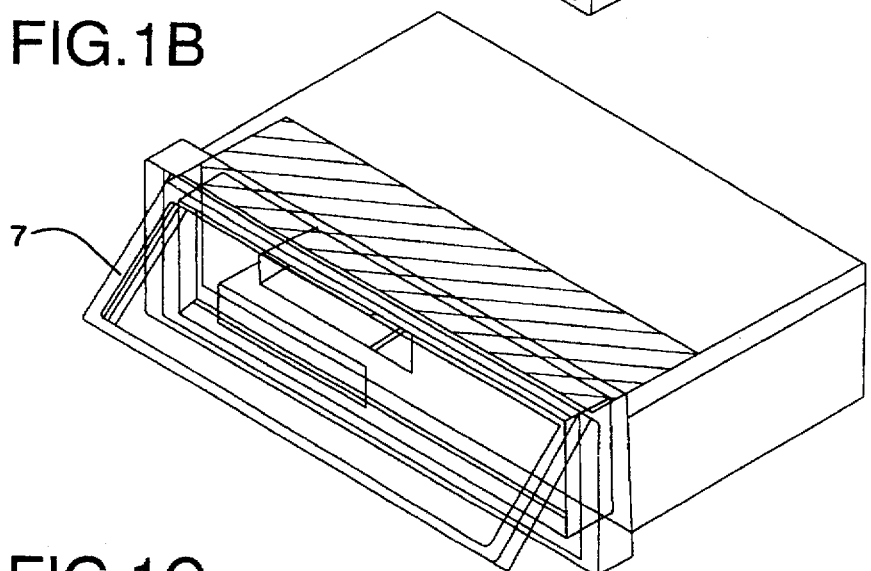
Figure 1C:
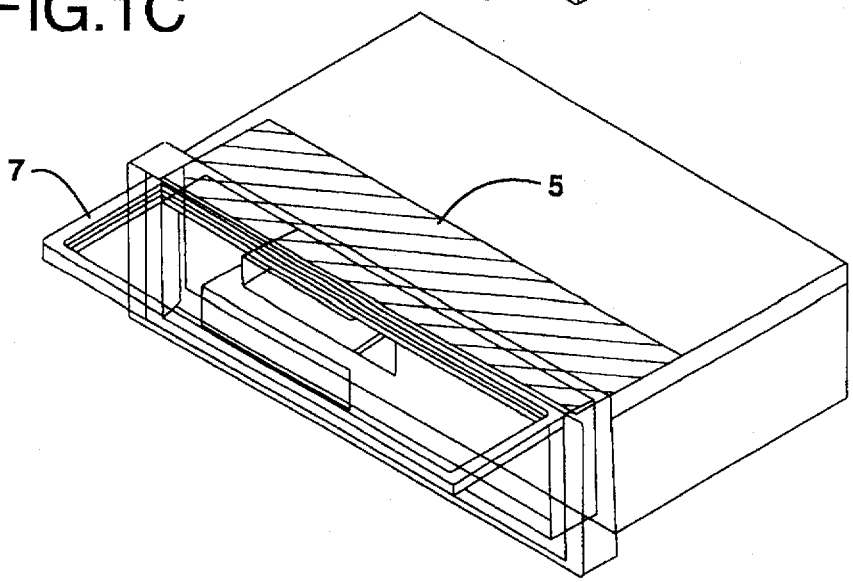
Figure 2A:
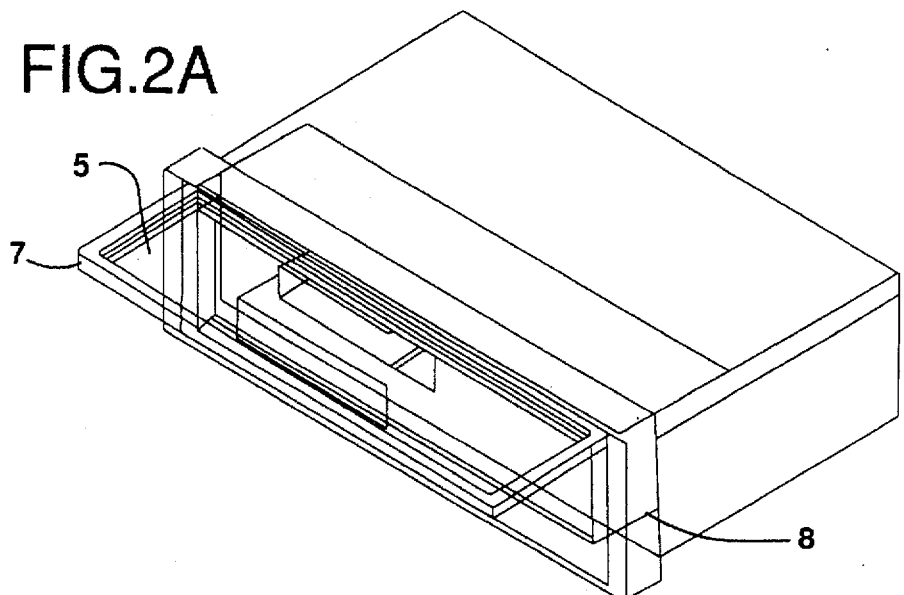
FIGS. 2A to 2C are perspective views illustrating the operation of the robbery-proof mechanism for a vehicle mounted acoustic apparatus.

FIG. 1A shows a use state of the vehicle mounted acoustic apparatus. An operation panel 8 is positioned at the front of the apparatus. A cassette insertion opening 8a is formed in the operation panel 8. When a start switch of the robbery-proof mechanism is depressed in the state shown in FIG. 1A, the frame 7 is rotated to the horizontal position as shown in FIGS. 1B and 1C. Under this state shown in FIG. 1C, a cover 5 is moved from the upper space in the chassis 4 to the frame 7 guided by a groove formed in the frame 7. At the same time, the operation panel 8 is moved backward. FIG. 2A shows the state of the moved cover 5 and operation panel 8.

Figure 2B:
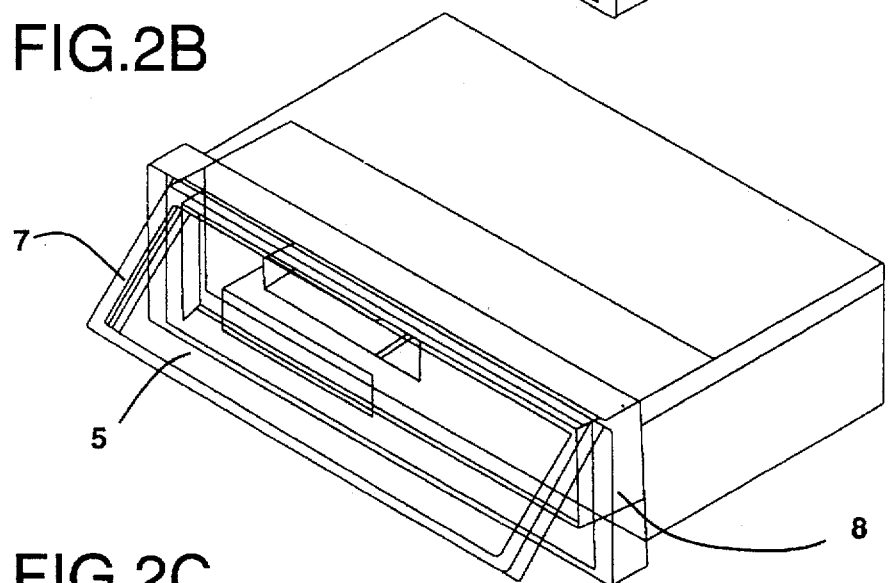
Figure 2C:
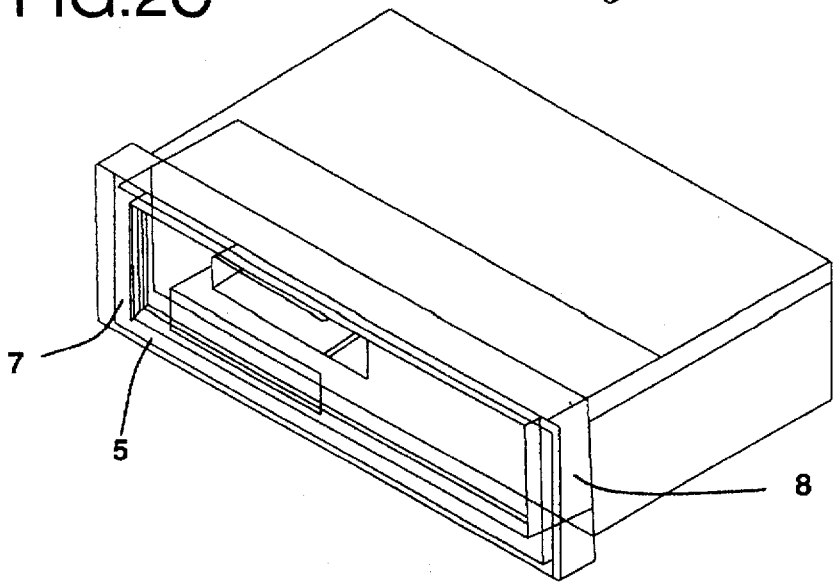

Next, as shown in FIGS. 2B and 2C, the frame 7 is rotated to the original position. In this state, the operation panel 8 is covered with the cover 5 and the vehicle mounted acoustic apparatus is shielded from eyes to prevent robbery. The above operations are performed in the reverse order when the vehicle mounted acoustic apparatus is used.

FIG. 3 shows the main part of a drive mechanism for the frame 7, cover 5, and operation panel 8. The frame 7 is rotatively supported by a shaft 6a mounted on the escutcheon 6. The frame 7 is formed with a groove 7a by which the cover 5 is guided into the frame 7. An arm 10 is rotatively supported by a shaft 4a mounted on the chassis 4, and coupled to the frame 7 via a shaft 10b, an arm 9, and a shaft 7b.

Levers 11, 12, and 13 are rotatively supported by a shaft 4b mounted on the chassis 4. The lever 11 has a shaft 11 protruding to the front side and a shaft 11b protruding to the rear side. The levers 12 and 13 are biased by a torsion coil spring 14 to squeeze a shaft 10a mounted on the lever 10 and the shaft 11a mounted on the lever 11. A shaft 11b engages with a cam groove 15a formed in a gear 15. Therefore, as the gear 15 rotates, the frame 7 rotates.

A slider 19 for driving the cover and operation panel via a shaft 19b is movably supported by shafts 4d and 4d mounted on the chassis. An arm 18 is rotatively supported by a shaft 4c mounted on the chassis. A shaft 19a mounted on the slider 19 engages with an elongated hole 18a formed in the arm 18. A shaft 17a mounted on a gear 17 engages with an elongated hole 18b formed in the arm 18. The slider 19 is therefore driven in the right and left directions by the rotation of the gear 17.

Figure 5:
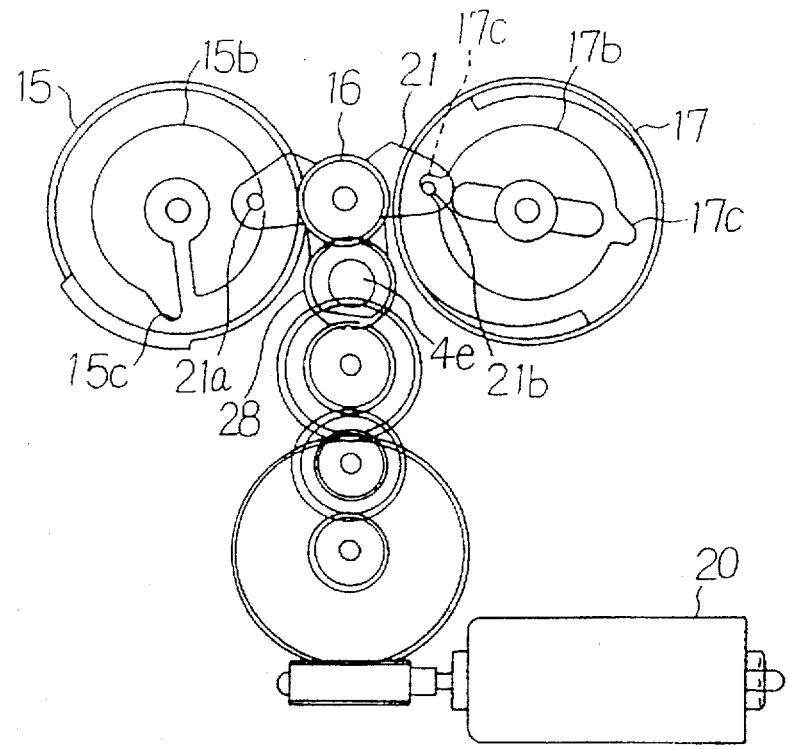

The gears 15 and 17 are rotated by a planetary gear 16. A drive mechanism for the gears 15 and 17 is shown in FIG. 5. The planetary gear 16 is rotatively supported by a shaft mounted on an arm 21. The arm 21 is rotatively supported by a shaft 4e mounted on the chassis. A gear 28 is rotatively supported by the shaft 4e and meshes with the planetary gear 16.

The gear 28 is rotated via a gear train by a motor 20 fixed to the chassis. Shafts 21a and 21b mounted on the arm 21 abut on a cam 15b of the gear 15 and on a cam 17b of the gear 17, respectively. Although the cams 15b and 17b are mounted on the rear surfaces of the gears, they are indicated by solid lines in FIG. 5. The planetary gear 16 and arm 21 are made in pressure contact with each other by a spring (not shown), and a friction force is generated therebetween. Therefore, the gear 28 exerts a rotation force on the planetary gear 16 and a torque on the arm 21. This torque is in the direction opposite to the rotation direction of the planetary gear 16.

A drive mechanism for the cover 5 and operation panel is shown in FIG. 7. The operation panel is fixedly mounted on a vertical surface 23b of a slider 23. The slider 23 is supported via four elongated holes by the chassis, being movable in the horizontal direction, and the posture thereof being maintained constant by a pantograph mechanism 27. An arm 25 is rotatively supported by a shaft 4g mounted on the chassis. A shaft mounted on the arm 25 engages with an elongated hole 23a formed in the slider 23. An elongated hole 25a formed in the arm 25 engages with a shaft 19b mounted on the slider 19 shown in FIG. 3.

A slider 22 for engaging with the cover 5 is supported by the chassis, being movable in the right and left directions as viewed in FIG. 7. An arm 24 is rotatively supported by a shaft 4f mounted on the chassis. An elongated hole 24a formed in the arm 24 engages with a shaft 22a mounted on the slider 22. A spring 26 fitted in the arm 24 engages with the shaft 19b. Therefore, the shaft 19b drives the sliders 22 and 23 in opposite directions.

The frame 7 and cover 5 are driven by the torsion coil spring 14 and a spring 26, respectively, so that they are stopped by an obstacle such as a hand. FIG. 4 shows the state of the forcibly stopped frame 7. Under this condition, the torsion coil spring 14 is bent and curved. When the frame 7 and cover 5 are forcibly stopped, this condition is detected by a micro switch (not shown) and the frame 7 and cover 5 are driven in the opposite direction and thereafter the cover 5 is again closed.

An LCD holder 31 shown in FIGS. 8 and 9 holds a display unit of the operation panel. The LCD holder 31 is mounted on the operation panel by using a printed circuit board 30. A lead plate 32 made of conductive material is fitted in the LCD holder 31. Specifically, the lead plate 32 is fitted in a recess 31a of the LCD holder 31, a projection 32a of the lead plate 32 is fitted in a hole 31b of the LCD holder 31, and a tongue 31c of the LCD holder 31 is bent upward to fixedly mount the lead plate 32 on the LCD holder 31. As shown in FIG. 9, the tip of the lead plate 32 is in slide contact with the chassis 4 to discharge electric charges accumulated on the LCD holder 31 by friction.

Figure 10:
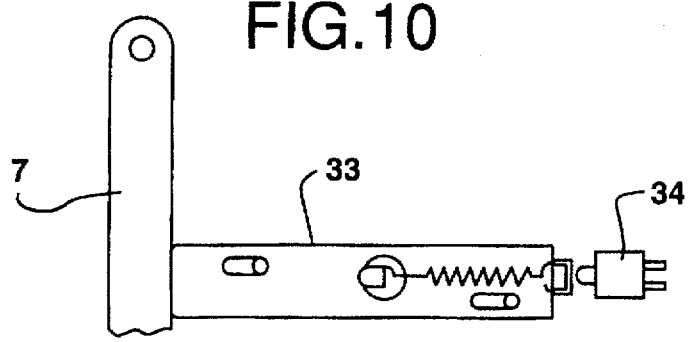

A micro switch 34 shown in FIG. 10 is disposed at the back of the frame 7, and is operated via a slider 33 by the frame 7. The slider 33 is supported by the chassis, being capable of sliding, and is biased in the left direction by a spring. The micro switch 34 is used when the drive mechanism is actuated in the direction of opening the cover.

Figure 11:
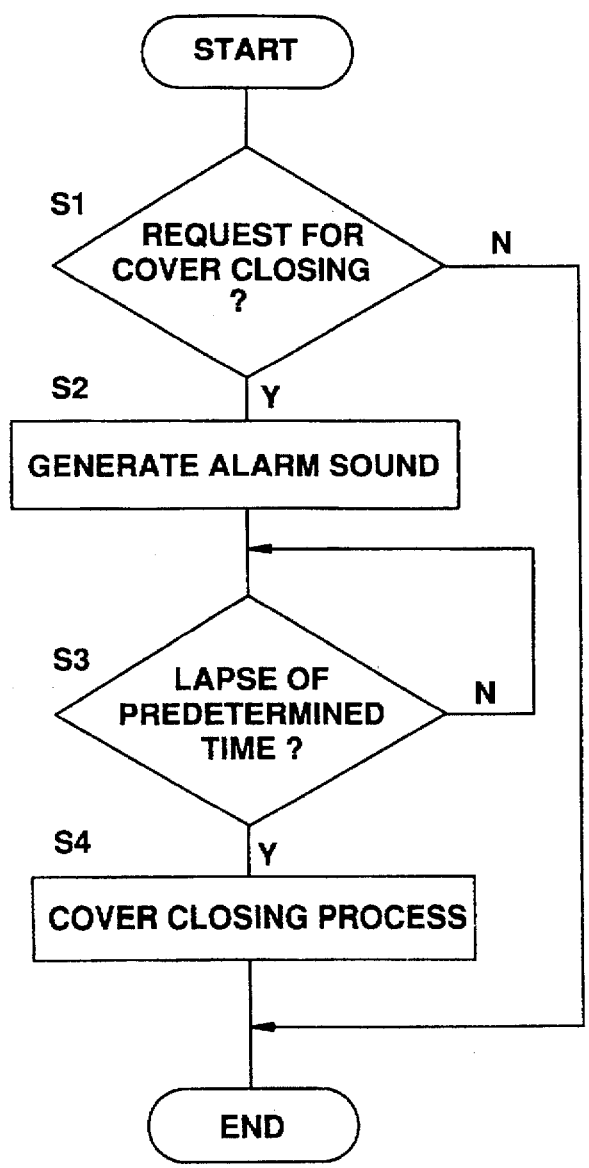
FIG. 11 is a flow chart illustrating the operation of the robbery-proof mechanism for a vehicle mounted acoustic apparatus.
Figure 12A:
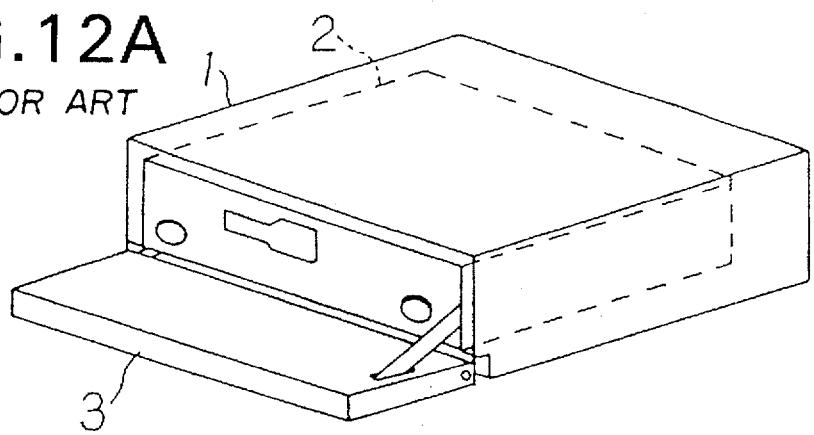
FIGS. 12(a), 12(b), and 12(c) are perspective views showing one of conventional robbery-proof mechanisms for vehicle mounted acoustic apparatus.
Figure 12B:
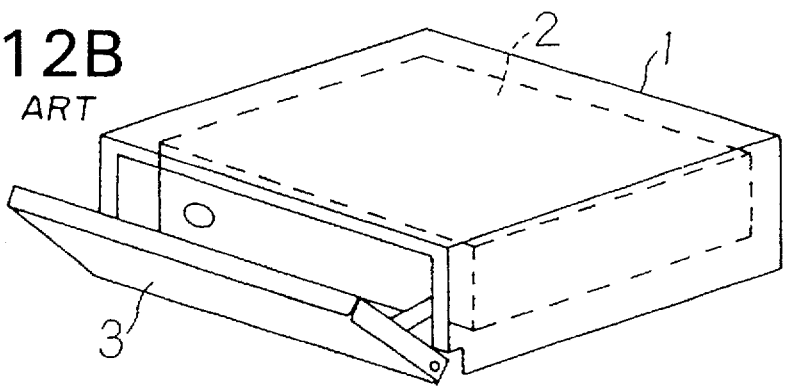
Figure 12C:
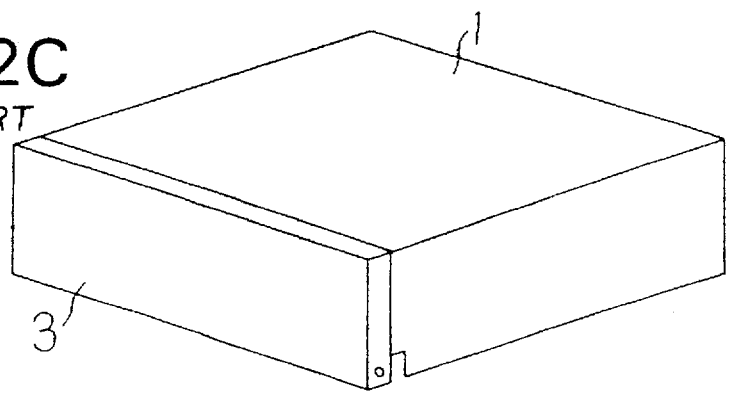

Next, the operation of the robbery-proof mechanism for a vehicle mounted acoustic apparatus will be described. When a start switch (not shown) mounted on the operation panel 8 is depressed under a use state (shown in FIG. 1A) of the acoustic apparatus, a microcomputer of a control circuit drives the robbery-proof mechanism by an operation routine illustrated in FIG. 11.

This routine is repeated at a constant time interval. It is checked at Step S1 whether or not the start switch is depressed. If not depressed, this routine is terminated. If depressed, an alarm sound is generated and a timer is started at Step S2, and thereafter the routine moves to Step S3.

It is checked at Step S3 whether a predetermined time (in this embodiment, 5 seconds) has lapsed after the timer start. If the predetermined time has lapsed, the alarm sound is stopped at Step S4 and the motor 20 is driven to load the cover.

In the cover loading process, the motor 20 is first rotated in the forward direction to rotate the gear 28 shown in FIG. 5 in the clockwise direction. Although the arm 21 is applied with a torque in the clockwise direction, it is maintained to be slanted in the counter-clockwise direction because of the engagement of the shaft 21a with the cam 15b, and the gear 28 together with the planetary gear 16 rotates the gear 15 in the clockwise direction. Therefore, the lever 11 is rotated in the counter-clockwise direction as viewed in FIG. 3 by the cam groove 15a. The lever 11 together with the lever 12 rotates the arm 10 in the counter-clockwise direction. The arm 10 together with the arm 9 rotates the frame 7 in the clockwise direction around the shaft 6a. When the frame 7 rotates to the horizontal position, a recess 15c of the cam 15b shown in FIG. 5 reaches the position corresponding to the shaft 21a. Therefore, the arm 21 becomes rotative in the clockwise direction, and the planetary gear 16 meshes with the gear 17.

As the motor 20 rotates further in the forward direction, the gear 17 is rotated in the clockwise direction, the operation panel moves backward, and the cover 5 moves forward. The rotation angle of the gear 17 necessary for pushing the cover into the frame 7 along the groove 7a is about 180 degrees. This rotation angle is detected by a micro switch (not shown) and the motor 20 is stopped. At this time, a recess 17c of the cam 17b reaches the position corresponding to the shaft 21b.

Next, the motor 20 is rotated in the backward direction to rotate the gear 28 in the counterclockwise direction. The arm 21 rotates in the counter-clockwise direction, and the planetary gear 16 meshes with the gear 15 to rotate the gear 15 in the counter-clockwise direction. At this time, the gear 17 does not rotate because the shaft 21b enters the recess 17c of the cam 17b. The lever 11 is rotated by the cam groove 15a in the clockwise direction. The lever 11 rotates the arm 10 in the clockwise direction, in combination with the lever 13, torsion coil spring 14, and lever 12.

Figure 6A:
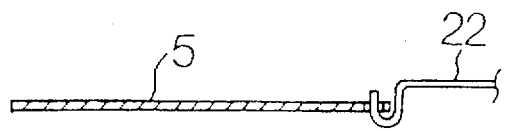
Figure 6B:
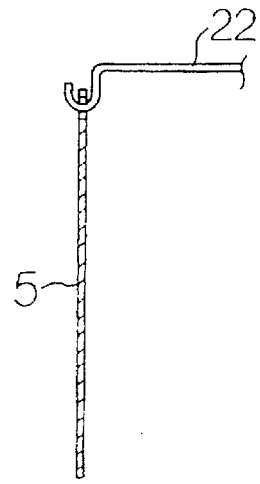

The arm 10 together with the arm 9 rotates the frame 7 loaded with the cover 5 in the counter-clockwise direction around the shaft 6a. When the frame 7 rotates to the vertical position, a micro switch (not shown) is actuated to stop the motor. In this state, the cover 5 shields the operation panel 8 as shown in FIG. 2C. The slider 22 rotatively engages the cover 5 as shown in FIGS. 6A and 6B.

When the micro switch 34 shown in FIG. 10 is depressed by the frame 7 in the state (shown in FIG. 2C) of an unused acoustic apparatus, the opening process for the cover 5 starts. At this time, although the frame 7 is at the vertical position, the spring 26 is bent and curved and the frame is rotated in the counter-clockwise direction as viewed in FIG. 3.

In the cover opening process, the motor 20 is first rotated in the forward direction to rotate the gear 28 shown in FIG. 5 in the clockwise direction. Although the arm 21 is applied with a torque in the clockwise direction, it is maintained to be slanted in the counter-clockwise direction because of the engagement of the shaft 21a with the cam 15b, and the gear 28 together with the planetary gear 16 rotates the gear 15 in the clockwise direction. Therefore, the lever 11 is rotated in the counter-clockwise direction as viewed in FIG. 3 by the cam groove 15a. The lever 11 together with the lever 12 rotates the arm 10 in the counter-clockwise direction.

The arm 10 together with the arm 9 rotates the frame 7 in the clockwise direction around the shaft 6a. When the frame 7 rotates to the horizontal position, the recess 15c of the cam 15b shown in FIG. 5 reaches the position corresponding to the shaft 21a. Therefore, the arm 21 becomes rotative in the clockwise direction, and the planetary gear 16 meshes with the gear 17.

As the motor 20 rotates further in the forward direction, the gear 17 is rotated in the clockwise direction, the operation panel moves forward, and the cover 5 moves backward to be accommodated in the chassis 1. The rotation angle of the gear 17 necessary for accommodating the cover 5 is about 180 degrees. This rotation angle is detected by a micro switch (not shown) and the motor 20 is stopped. At this time, the recess 17c of the cam 17b reaches the position corresponding to the shaft 21b.

Next, the motor 20 is rotated in the backward direction to rotate the gear 28 in the counter-clockwise direction. The arm 21 rotates in the counter-clockwise direction, and the planetary gear 16 meshes with the gear 15 to rotate the gear 15 in the counter-clockwise direction. The lever 11 is rotated by the cam groove 15a in the clockwise direction. The lever 11 rotates the arm 10 in the clockwise direction, in combination with the lever 13, torsion coil spring 14, and lever 12.

The arm 10 together with the arm 9 rotates the frame 7 loading the cover 5 in the counter-clockwise direction around the shaft 6a. When the frame 7 rotates to the vertical position, a micro switch (not shown) is actuated to stop the motor. In this state, the acoustic apparatus enters a use state illustrated in FIG. 1A.

Although the embodiment is structured as above, a series of cover opening/closing operations may be performed synchronously with the turn-on/off of a vehicle accessary (ACC) power source. In this case, when the ACC power source is turned on, the cover is automatically closed, and when the ACC power source is turned off, the cover is automatically opened. With this arrangement, the effects of robbery-proof can be improved because the driver does not move out of the car with the cover being incompletely closed during the car running by an obstacle such as a hand, or because the driver does not move out of the car with the cover closing operation being forget.

In the above embodiment, although the front of the robbery-proof mechanism of the vehicle mounted acoustic apparatus is rectangular, a gate shape without the bottom side may be used. Furthermore, although the audio apparatus is used as the vehicle mounted acoustic apparatus, it is obvious that the invention is applicable to other vehicle mounted electronic apparatus such as a radio wave apparatus.

According to the robbery-proof mechanism for a vehicle mounted electronic apparatus, the drive mechanism can be made small, and it is possible to mount the robbery-proof mechanism for a vehicle mounted electronic apparatus, without working a mount space of the vehicle. Noises are not generated while driving.

With the robbery-proof mechanism for a vehicle mounted electronic apparatus wherein the operation panel is moved forward and backward, the operation panel is positioned flush with the mount surface of the electronic apparatus when it is in use. Therefore, it is easy to use. When the operation panel is not in use, the cover covering the operation panel is positioned flush with the mount surface of the electronic apparatus. Therefore, the electronic apparatus can be made hard to be confirmed.

With the robbery-proof mechanism for a vehicle mounted electronic apparatus wherein the conductive member is fitted in the LCD holder mounted on the operation panel, electrostatic charges generated by friction are grounded to the chassis via the conductive member. Therefore, the breakage of the LCD can be avoided.

With the robbery-proof mechanism for a vehicle mounted electronic apparatus wherein the rotation center of the frame is set to the upper side, the open space under the frame when it is not completely closed is hard to be seen. Therefore, a presence of the vehicle mounted electronic apparatus is difficult to be confirmed.

With the robbery-proof mechanism for a vehicle mounted electronic apparatus wherein the switch for starting opening the robbery-proof mechanism is actuated by the frame, the switch is not needed to be mounted at the place remote from the vehicle mounted electronic apparatus. Therefore, the mount of the vehicle mounted electronic apparatus becomes easy. With the robbery-proof mechanism for a vehicle mounted electronic apparatus wherein the robbery-proof mechanism starts operating after a predetermined time lapse after the switch is actuated, there is less possibility of abutting a hand on the frame when the driver is manipulating the operation panel.

What is claimed is:

1. A robbery-proof mechanism for a vehicle mounted electronic apparatus, comprising:

a frame mounted on the front of the vehicle mounted electronic apparatus, being rotative between a horizontal position and a vertical position;

a cover capable of being inserted into a groove formed in said frame;

a drive mechanism for driving said cover in the horizontal direction between a position in the groove of said frame and a position retracted from said frame; and a drive mechanism for driving an operation panel in the horizontal direction, wherein said frame is rotated to the horizontal position, said cover is then moved into the groove of said frame and the operation panel is moved backward, and said frame together with said cover is rotated to the vertical position to cover the operation panel with said cover.

2. A robbery-proof mechanism for a vehicle mounted electronic apparatus according to claim 1, wherein a conductive member is fitted in an LCD holder mounted on the operation panel, said conductive member being in slide contact with a chassis by the elastic force of said conductive member.

3. A robbery-proof mechanism for a vehicle mounted electronic apparatus according to claim 1, wherein a switch is actuated by pushing said frame, said switch being used for starting the operation of moving said cover from the position where said cover covers the operation panel to the position where said cover is retracted from said frame.

4. A robbery-proof mechanism for a vehicle mounted electronic apparatus according to claim 1, wherein when a switch is actuated, the operation of moving said cover from an open state to a close state starts after a predetermined time lapse, said switch being used for starting said operation.

5. A robbery-proof mechanism for a vehicle mounted electronic apparatus, comprising:

a frame mounted on the front of the vehicle mounted electronic apparatus, being rotative between a horizontal position and a vertical position;

a cover capable of being inserted into a groove formed in said frame; and a drive mechanism for driving said cover in the horizontal direction between a position in the groove of said frame and a position retracted from said frame, wherein said frame is rotated to the horizontal position, said cover is then moved into the groove of said frame, and said frame together with said cover is rotated to the vertical position to cover an operation panel with said cover.

6. A robbery-proof mechanism for a vehicle mounted electronic apparatus according to claim 1, wherein a conductive member is fitted in an LCD holder mounted on the operation panel, said conductive member being in slide contact with a chassis by the elastic force of said conductive member.

7. A robbery-proof mechanism for a vehicle mounted electronic apparatus according to claim 1, wherein a switch is actuated by pushing said frame, said switch being used for starting the operation of moving said cover from the position where said cover covers the operation panel to the position where said cover is retracted from said frame.

8. A robbery-proof mechanism for a vehicle mounted electronic apparatus according to cliam 1, wherein when a switch is actuated, the operation of moving said cover from an open state to a close state starts after a predetermined time lapse, said switch being used for starting said operation.

9. A vehicle mounted electronic apparatus having a robbery-proof mechanism, comprising:

a chassis of electronic apparatus;

an operation panel of electronic apparatus movable forward and backward in the inside of said chassis;

a cover for concealing said operation panel at the front of said chassis, said cover being contained in said vehicle mounted electronic apparatus; and means for moving said cover and said operation panel so that said operation panel is moved forward when said cover is opened and said operation panel is moved backward when said cover is closed.

10. A vehicle mounted electronic apparatus having a robbery-proof mechanism according to claim 9, wherein said means for moving said cover and said operation panel comprises a single driving source.

* * * * *